(12) United States Patent
Miscopein et al.

(10) Patent No.: US 8,918,130 B2
(45) Date of Patent: Dec. 23, 2014

(54) METHOD FOR TRANSMITTING A COMMUNICATION SIGNAL

(75) Inventors: Benoît Miscopein, Grenoble (FR); Jean Schwoerer, Grenoble (FR)

(73) Assignee: Orange, Paris (FR)

( * ) Notice: Subject to any disclaimer, the term of this patent is extended or adjusted under 35 U.S.C. 154(b) by 265 days.

(21) Appl. No.: 13/514,669

(22) PCT Filed: Dec. 14, 2010

(86) PCT No.: PCT/FR2010/052714
§ 371 (c)(1),
(2), (4) Date: Jun. 8, 2012

(87) PCT Pub. No.: WO2011/080451
PCT Pub. Date: Jul. 7, 2011

(65) Prior Publication Data
US 2012/0244896 A1    Sep. 27, 2012

(30) Foreign Application Priority Data

Dec. 14, 2009   (FR) ..................................... 09 58962

(51) Int. Cl.
*H04W 52/02* (2009.01)
*H04W 28/06* (2009.01)
*H04W 28/04* (2009.01)
*H04W 84/18* (2009.01)
*H04W 88/04* (2009.01)

(52) U.S. Cl.
CPC .............. *H04W 28/06* (2013.01); *H04W 28/04* (2013.01); *H04W 84/18* (2013.01); *H04W 88/04* (2013.01)
USPC ............ 455/500; 455/73; 455/502; 455/13.1; 370/390; 370/315

(58) Field of Classification Search
CPC ..... H04W 28/04; H04W 28/06; H04W 84/18; H04W 88/04; H04W 52/0238; Y04B 60/50; Y04B 60/00; Y04B 60/10; Y04B 60/12; Y04B 60/14; Y04B 60/16; Y04B 60/18; Y04B 60/40; Y04B 60/1239; Y04B 60/1203

USPC ............ 455/500, 73, 434, 436, 90, 260, 522, 455/574, 418, 115.1, 13.1, 13.4, 9; 370/235, 311, 400, 328, 470, 318, 252, 370/315, 390, 329, 478

See application file for complete search history.

(56) References Cited

U.S. PATENT DOCUMENTS 5,361,261 A * 11/1994 Edem et al. ................... 370/445
5,696,903 A * 12/1997 Mahany ........................ 709/228

(Continued)

FOREIGN PATENT DOCUMENTS

WO     2010/018521 A2    2/2010

OTHER PUBLICATIONS

Chatterjea et al., "AI-LMAC: An Adaptive, Information-centric and Lightweight MAC Protocol for Wireless Sensor Networks," ISSNIP-IEEE, pp. 381-388 (Dec. 14, 2004).

(Continued)

*Primary Examiner* — Tan Trinh
(74) *Attorney, Agent, or Firm* — Drinker Biddle & Reath LLP

(57) ABSTRACT

A data transmitter is provided for transmitting data that makes it possible for nodes, relaying the preamble transmitted by a transmitter node, to also transmit data to a single destination node without, in turn, transmitting another preamble. In a network comprising a plurality of nodes that alternately observe sleeping and waking periods in an asynchronous manner relative to each other, a node receives a first preamble that is transmitted by at least one transmitter node. The first preamble comprises at least one first set of information related to transmission, by the transmitter node, of a first data set to a destination node. The adjacent node transmits a second data set to the destination node or to another node from the transmission of the first data set.

13 Claims, 3 Drawing Sheets

(56) References Cited

U.S. PATENT DOCUMENTS

| | | | |
|---|---|---|---|
| 6,278,864 B1* | 8/2001 | Cummins et al. | 455/73 |
| 8,089,909 B2* | 1/2012 | Kim et al. | 370/311 |
| 8,175,016 B1* | 5/2012 | Basu et al. | 370/311 |
| 2003/0119503 A1* | 6/2003 | Shohara et al. | 455/434 |
| 2007/0153729 A1* | 7/2007 | Alapuranen | 370/329 |
| 2008/0101364 A1* | 5/2008 | Chow et al. | 370/390 |
| 2009/0103437 A1* | 4/2009 | Kim et al. | 370/235 |
| 2011/0211513 A1* | 9/2011 | Eregen et al. | 370/311 |
| 2011/0269462 A1* | 11/2011 | Sagfors et al. | 455/436 |
| 2013/0128786 A1* | 5/2013 | Sultan et al. | 370/311 |
| 2013/0142108 A1* | 6/2013 | Ji et al. | 370/315 |

OTHER PUBLICATIONS

Hurni et al., "Increasing Throughput for WiseMAC," Fifth Annual Conference on Wireless on Demand Network Systems and Services, 2008, WONS 2008, IEEE, Piscataway, NJ, USA, pp. 105-108 (Jan. 23, 2008).

Miscopein et al., "Cooperative beacon-free MAC layer for Body Area Networks," 20th International Symposium on Personal, Indoor and Mobile Radio Communications, 2009 IEEE, Piscataway, NJ, USA, pp. 2157-2161 (Sep. 13, 2009).

Van Hoesel et al., "A Lightweight Medium Access Protocol (LMAC) for Wireless Sensor Networks: Reducing Preamble Transmissions and Transceiver State Switches," First International Conference on Networked Sensing Systems, Tokyo, 2004, pp. 1-4 (Jun. 30, 2004).

\* cited by examiner

METHOD FOR TRANSMITTING A COMMUNICATION SIGNAL

CROSS-REFERENCE TO RELATED APPLICATIONS

This application is the U.S. national phase of the International Patent Application No. PCT/FR2010/052714 filed Dec. 14, 2010, which claims the benefit of French Application No. 09 58962 filed Dec. 14, 2009, the entire content of which is incorporated herein by reference.

FIELD

The present invention relates generally to the transmission of communication signals in a network of nodes. It applies in particular to ad hoc networks, such as networks of sensors, for example.

BACKGROUND

In a network formed by a plurality of nodes, various approaches may be followed for placing the nodes on standby in order to reduce effectively their electrical power consumption. It is possible for example to place the receiver means of the nodes in sleep mode in periods during which the latter do not transmit or receive data to or from other nodes. Thus the nodes can transmit or receive data only during their waking periods. These waking periods are generally not synchronized between the nodes. It is thus understandable that the choice of a channel access protocol adapted to these constraints proves to be of particular importance when it is a matter of economizing on the energy resources available at each node of the network.

In particular, channel access protocols known as preamble sampling protocols are based on the principle of transmission of a preamble on a channel by a transmitter node having data to transmit to a receiver node. Periodically, and for a brief period, the receiver means of the receiver node are activated, in an asynchronous manner relative to those of the other nodes. The receiver node then listens to the channel to determine if a preamble is being transmitted. The receiver node typically listens to the end of the preamble to access the data. The nodes of the same network having the same channel listening period, the transmitter node sends a preamble for at least as long as the duration of this listening period. All the nodes in the vicinity of the transmitter node are thus awakened by the preamble sent by the transmitter node, which induces an unnecessary consumption of energy. The transmitter node may also insert data into the preamble to enable the receiver node to determine if said preamble concerns it, if data is going to be transmitted to it, and when that transmission will take place. Thus the receiver node may manage the sleeping state of its receiver means accordingly.

Preamble sampling channel access protocols are well suited to sensor networks, characterized by a low data rate. The energy resources of the sensors generally being limited, such management of access to the channel enables significant reductions in energy consumption to be observed, resulting from periodically placing the receiver means of the nodes in the sleeping state. These savings are all the more sensitive given that the traffic generated by such sensors is typically sporadic.

Furthermore, the architecture of sensor networks is typically built around sink nodes responsible for collecting data transmitted by groups of sensor nodes. Also, a significant proportion of the data transmitted over the network converges towards the sink nodes.

Now, known preamble sampling channel access protocols provide for the sending of a preamble by each sensor node seeking to transmit data to one of the sink nodes. When a large number of sensor nodes have data to transmit over a short time period, a large number of preambles are therefore also transmitted. On the one hand, this behavior proves somewhat unsatisfactory from the energy point of view, transmission of each preamble necessitating the consumption by the sensor nodes of a quantity of energy. On the other hand, the risk of collision on access to the channel during this period is notably increased.

There therefore exists a need to transmit data from a plurality of transmitter nodes over a channel to at least one receiver node, minimizing the electrical power consumption of the various transmitter nodes and reducing the risk of collision on access to the channel by the transmitter nodes.

SUMMARY

The present invention aims to improve upon the present situation.

In a first aspect, there is proposed a method of transmission of data notably enabling nodes relaying the preamble transmitted by a transmitter node also to transmit data to the same destination node without in turn transmitting another preamble.

In a network including a plurality of nodes alternating sleeping periods and waking periods asynchronously with respect to each other, the method implemented by a first node includes the following steps:

a reception of a first preamble transmitted by at least one transmitter node, the first preamble including at least one first set of information relating to transmission by the transmitter node of a first set of data to a destination node;

b transmission to the destination node or to a second node of a second set of data after transmission of the first set of data.

The method enables mutualization of the same preamble to signify the later transmission of a plurality of sets of data. Thus in the end a smaller number of preambles is sent on the channel in a shorter period, limiting on the one hand electrical power consumption of the nodes and on the other hand the occupancy of the channel and thus the risk of collision. Furthermore, the first node may transmit data to a node of the network even if it has not transmitted a preamble. This situation notably arises when a node is excluded from a preamble relay following a conflict with another node designated as having priority for the transmission of said preamble.

In one embodiment, the first node:

modifies the first preamble by adding a second set of information relating to the transmission of the second set of data by the first node; and transmits the first preamble as modified before the transmission of the first set of data.

In this embodiment, the neighbor node has the possibility of communicating via the same first preamble its intention to transmit data to another node, including to another neighbor node, without transmission of a supplementary preamble. This embodiment is in particular very suitable when the traffic on the network is sustained.

The first preamble may optionally include an indication relating to a preamble mutualization mode, said indication belonging to a group comprising a single destination mutualization mode and a multiple destination mutualization mode. The neighbor node thus knows the preamble mutualization mode used for this transmission and can adapt its behavior accordingly.

In one embodiment, when the indication relating to a preamble mutualization mode corresponds to the single destination mutualization mode, the second set of information added relates to transmission of the second set of data by the first node to the destination node. The second set of data is transmitted to the destination node.

In a second aspect there is proposed a data transmission device adapted to be integrated into a network including a plurality of nodes alternating sleeping periods with waking periods. It includes:
  receiving means adapted to receive a first preamble transmitted by at least one transmitter node, the first preamble including at least one first set of information relating to transmission by the transmitter node of a first set of data to a destination node;
  transmission means adapted to transmit to the destination node or to a second node a second set of data after transmission of the first set of data.

In a third aspect there is proposed a method of reception by a node of a preamble transmitted by at least a first node by a method according to the first aspect of the invention. The method includes the following steps implemented by said node:
  reception of the preamble;
  extraction of information included in the preamble announcing at least the transmission of the first set of data to a destination node;
  if the node is the destination node announced in the preamble, reception of the first and second sets of data.

The receiving method may include an optional step of awaiting other sets of data following transmission of the first and second sets of data.

In one embodiment, the method includes the following steps:
  extraction of information included in the preamble including an indication relating to the preamble mutualization mode, said indication belonging to a group comprising a single destination mutualization mode and a multiple destination mutualization mode;
  if the node is not the destination node, sleeping for a period calculated as a function of said indication.

If the node is not the announced destination node and if the preamble mutualization mode indicated is the multiple destination mode said method may optionally include the following steps:
  sleeping until the beginning of the transmission of the first set of data;
  reception of descriptive data coming from the transmitter node;
  if the descriptive data includes information indicating that the node is the destination of a set of data, reception of said set of data.

The method may then equally include a step of sleeping after reception of the descriptive data if the descriptive data does not include any information relating to the transmission of a set of data to the node.

In a fourth aspect there is proposed a device for receiving a preamble transmitted by at least one first node by a method according to the first aspect of the invention, including:
  means for receiving the preamble;
  means for extraction of information included in the preamble announcing at least the transmission of the first set of data to a destination;
  receiver means adapted to receive the first and the second sets of data if the device is the destination announced in the preamble.

The invention also concerns a node including means adapted to use the transmission method according to the first aspect and the reception method according to the third aspect of the invention.

In one particular embodiment, the various steps of the transmission and reception methods of the invention are determined by computer program instructions.

Consequently, the invention is also directed to computer programs on an information medium, these programs being adapted to be used in nodes or more generally in a computer, these programs including instructions adapted to implement the steps of the methods of transmission, of reception by a destination node and of reception by a neighbor node that have just been described.

These programs may use any programming language and take the form of source code, object code or an intermediate code between source code and object, such as a partially compiled form, or any other desirable form.

The invention is also directed to a computer-readable information medium containing instructions of a computer program as referred to hereinabove.

The information medium may be any entity or device capable of storing the program. For example, the medium may include storage means, such as a ROM, for example a CD-ROM or a microelectronic circuit ROM, or magnetic storage means, for example a diskette (floppy disk) or a hard disk.

Furthermore, the information medium may be a transmissible medium such as an electrical or optical signal, which may be routed via an electrical or optical cable, by radio or by other means. The program of the invention may in particular be downloaded over an Internet type network.

Alternatively, the information medium may be an integrated circuit into which the program is incorporated, the circuit being adapted to execute the methods in question or to be used in the execution thereof.

Other aspects, aims and advantages of the invention will become apparent on reading the description of one embodiment thereof.

BRIEF DESCRIPTION OF THE DRAWINGS

The invention will also be better understood with the aid of the drawings, in which.

DETAILED DESCRIPTION

In the description given hereinafter, a communication network is considered including a plurality of nodes.

Communication signals transmitted from a transmitter node to a destination node via neighbor nodes may correspond to a preamble or to data. The transmission mode used is based on a technique of putting the nodes to sleep and preamble sampling.

Figure 1:
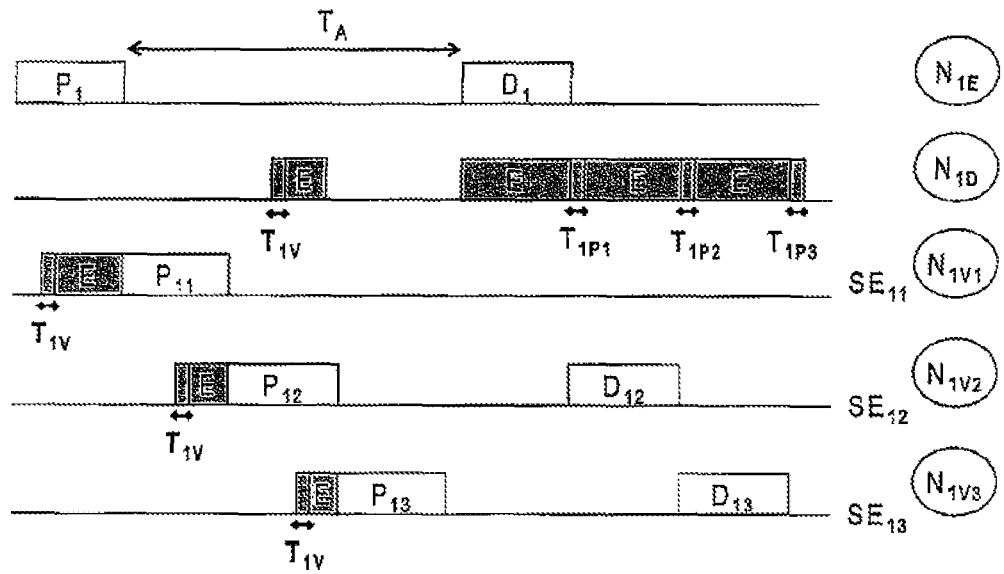
FIG. 1 is a timing diagram showing the principle of operation, in a first embodiment, of a communication signal transmission mode based on a technique of putting the nodes to sleep and preamble sampling.

FIG. 1 represents the theory of operation, in a first embodiment, of a mode of transmission of a communication signal based on a technique of putting the nodes to sleep and preamble sampling. This first embodiment notably enables nodes relaying the preamble transmitted by a transmitter node also to transmit data to the same destination node without in turn transmitting another preamble. A transmitter node $N_{1E}$ transmits data $D_1$ to a destination node $N_{1D}$. These transmission steps are preceded by a step of transmission of an initial preamble $P_1$. The preamble $P_1$ includes a set of information enabling determination of the node for which the data $D_1$ is intended and when the latter data will be transmitted by the transmitter node $N_{1E}$. The set of information may thus include one or more items of information from the following list: the identification of the destination node $N_{1D}$, an indication relating to a preamble mutualization mode, the address of the destination node $N_{1D}$, the remaining time before the transmission of the data $D_1$, the period during which the data $D_1$ will be transmitted, the time corresponding to the beginning of the transmission of the data $D_1$, or the address of the transmitter node $N_{1E}$. The preamble mutualization mode is for example chosen from a group comprising a single destination preamble mutualization mode and a multiple destination preamble mutualization mode. The single destination preamble mutualization mode is then a mode in which the neighbor nodes are authorized to send data only to the destination node $N_{2D}$. The multiple destination preamble mutualization mode is a mode in which the neighbor nodes are authorized to send data to any other node of the network.

In particular time information, such as the time remaining before the transmission of the data $D_1$, the period during which the data $D_1$ will be transmitted, or the time corresponding to the beginning of the transmission of the data $D_1$, may be expressed as a number of modulation symbol times, the modulation symbol time being common to all the nodes of the network.

This information may be situated at the end of the preamble or repeated throughout preamble transmission.

The duration of the initial preamble $P_1$ is very much less than the sleeping period of a node. For example, the duration of the preamble $P_1$ is of the order of a few milliseconds. For example, the duration of the initial preamble $P_1$ is less than five milliseconds to satisfy rules defined by regulations applying to ultra wide band systems in some countries.

By way of nonlimiting examples of the invention, FIG. 1 shows three substeps $SE_{11}$, $SE_{12}$ and $SE_{13}$ effected by the respective neighbor nodes $N_{1V1}$, $N_{1V2}$ and $N_{1V3}$ of the transmitter node $N_{1E}$.

During a substep $SE_{11}$, the neighbor node $N_{1V1}$, awakened at a time $T_{1V}$ when the initial preamble $P_1$ is transmitted by the transmitter node $N_{1E}$, detects the preamble $P_1$ and receives the set of information included in the preamble $P_1$. The neighbor node $N_{1V1}$ remains in the awakened state E until the end of transmission of the initial preamble $P_1$ by the transmitter node $N_{1E}$. The neighbor node $N_{1V1}$ then in turn transmits a preamble $P_{11}$. In the example of FIG. 1, the neighbor node $N_{1V1}$ has no data to transmit to the destination node $N_{1D}$. If the preamble $P_1$ includes an indication relating to a preamble mutualization mode, the neighbor node $N_{1V1}$ may take note of the preamble mutualization mode. Accordingly, in the example shown in FIG. 1, corresponding to a single destination preamble mutualization mode, the neighbor node $N_{1V1}$ can determine that it is not authorized to transmit data to the destination node $N_{1V3}$ using the preamble $P_1$.

The preamble $P_{11}$ transmitted by the node $N_{1V1}$ includes all of the information included in the preamble $P_1$. Time information such as the time remaining before the transmission of the data $D_1$ is updated by the node $N_{1V1}$ if necessary.

During a substep $SE_{12}$, the neighbor node $N_{1V2}$, awakened at a time $T_{1V1}$ when the preamble $P_{11}$ is transmitted by the neighbor node $N_{1V1}$, detects the preamble $P_{11}$ and receives the set of information included in the preamble $P_{11}$. The neighbor node $N_{1V2}$ has data $D_{12}$ to transmit to the destination node $N_{1D}$. The neighbor node $N_{1V2}$ remains in the awakened state E at least until the end of transmission of the preamble $P_{11}$ by the neighbor node $N_{1V1}$. Thus on reading the preamble $P_{11}$ the neighbor node $N_{1V2}$ may determine that the transmitter node $N_{1E}$ is going to transmit data and at what period that transmission will take place. The neighbor node $N_{1V2}$ then in turn transmits a modified preamble $P_{12}$. The preamble $P_{12}$ includes all the information included in the preamble $P_{11}$. Time information such as the time remaining before the transmission of the data $D_1$ is updated by the node $N_{1V2}$ if necessary. The preamble $P_{12}$ also includes information indicating that the neighbor node $N_{1V2}$ is seeking to transmit to the destination node $N_{1D}$ data such as the address of the neighbor node $N_{1V2}$ for example.

During a substep $SE_{13}$, the neighbor node $N_{1V3}$, awakened at a time $T_{V}$ when the preamble $P_{12}$ is transmitted by the neighbor node $N_{1V2}$, detects the preamble $P_{12}$ and receives the set of information included in the preamble $P_{12}$. The neighbor node $N_{1V3}$ has data $D_{13}$ to transmit to the destination node $N_{1D}$. The neighbor node $N_{1V3}$ remains in the awakened state E at least until the end of transmission of the preamble $P_{12}$ by the neighbor node $N_{1V2}$. Thus on reading the preamble $P_{13}$ the neighbor node $N_{1V3}$ may determine that the transmitter node $N_{1E}$ and the neighbor node $N_{1V2}$ are going to transmit data and at what periods these transmissions will take place. The neighbor node $N_{1V3}$ then in turn sends a modified preamble $P_{13}$.

The preamble $P_{13}$ includes all of the information included in the preamble $P_{12}$. Time information such as the time remaining before transmission of the data $D_1$ is updated by the neighbor node $N_{1V3}$ if necessary. The preamble $P_{13}$ also includes information indicating that the neighbor node $N_{1V3}$ is seeking to transmit data, after the neighbor node $N_{1V2}$, to the destination node $N_{1D}$, such as the address of the neighbor node $N_{1V3}$ introduced after the address of the neighbor node $N_{1V2}$, for example. In this latter example, the preamble $P_{13}$ includes an ordered sequence of addresses of neighbor nodes seeking to transmit data to the destination node $N_{1D}$.

At the end of a waiting time $T_A$ at least equal to a sleeping period of a node, the transmitter node $N_{1E}$ transmits the data $D_1$. The neighbor node $N_{1V2}$ transmits the data $D_{12}$ substantially immediately after the end of transmission of the data $D_1$ by the transmitter node $N_{1E}$. The neighbor node $N_{1V3}$ then transmits the data $D_{13}$ substantially immediately after the end of transmission of the data $D_{12}$ by the neighbor node $N_{1V2}$. The transmission of the data $D_{12}$ and $D_{13}$ is effected in the order of declaration by the neighbor nodes of their intention to transmit data. Thus the neighbor node $N_{1V2}$ having transmitted, before the neighbor node $N_{1V3}$, a preamble including information indicating that it was seeking to send data to the destination node $N_{1D}$, the data $D_{12}$ is transmitted before the data $D_{13}$.

Among other things, the waiting time $T_A$ depends on the sleeping period of the nodes and is at least equal to that sleeping period. If the destination node $N_{1D}$ is awakened during transmission of one of the preambles $P_1$, $P_{11}$, $P_{12}$, $P_{13}$ it can identify that the data $D_1$ is intended for it and at what time it must be transmitted.

After the end of transmission of the data $D_1$, the destination node $N_{1D}$ remains awake for as long as data is transmitted to it by nodes. To this end, the destination node $N_{1D}$ may obtain this information on reading the received preambles if the latter include information indicating that at least one neighbor node is seeking to transmit data to the destination node $N_{1D}$. The destination node may equally remain awake during a time-delay $T_{1P1}$ following reception of the data $D_1$ to verify if any other data is sent to it. Accordingly, if during the time-delay $T_{1P1}$ data addressed to the destination $N_{1D}$ is received, then the destination node $N_{1D}$ remains awake until expiry of a new time-delay $T_{1P2}$ following the end of reception of said data. A new sleeping period of the destination node $N_{1D}$ begins only if no data is received at the end of the new time-delay $T_{1P3}$. The destination node $N_{1D}$ thus remains awake for the duration of a string of data reception periods and then time-delay periods, as long as data is transmitted to it. In the example of FIG. 1, after the end of transmission of the data $D_1$, at least some of the data $D_{12}$ transmitted by the neighbor node $N_{1V2}$ is received during the time-delay $T_{1P1}$. A new time-delay $T_{1P2}$ begins after the end of transmission of the data $D_{12}$. At least some of the data $D_{13}$ transmitted by the neighbor node $N_{1V3}$ is received during the time-delay $T_{1P2}$. A new time-delay $T_{1P3}$ begins after the end of transmission of the data $D_{13}$. At the end of the time-delay $T_{1P3}$, no data having been received, the destination node $N_D$ may then go back to sleep.

Figure 2:
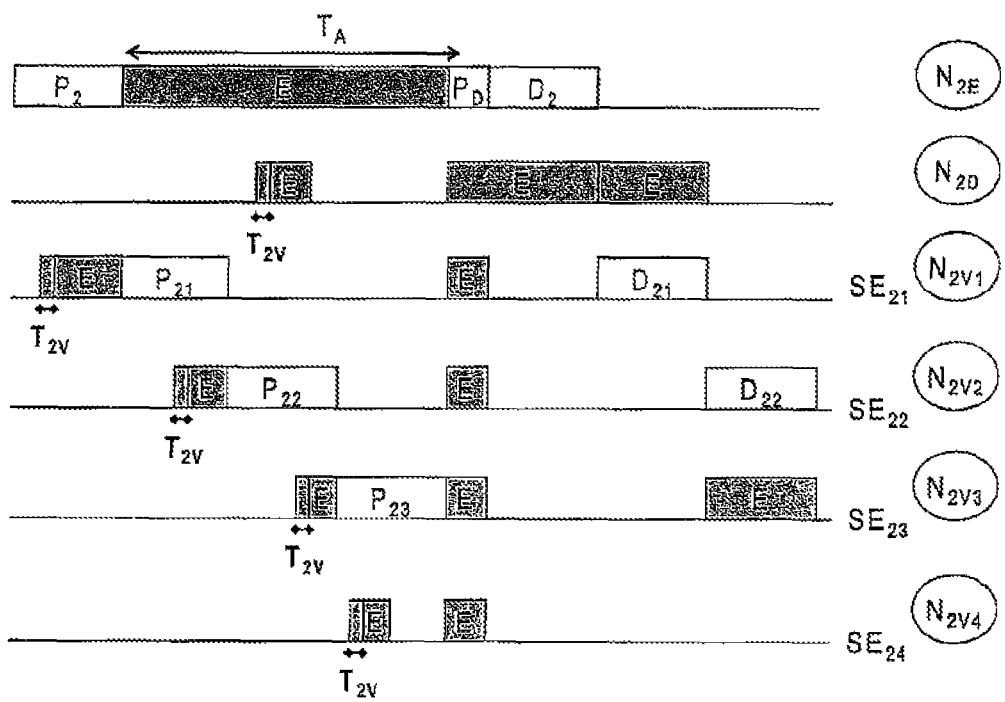
FIG. 2 is a timing diagram showing the principle of operation, in a second embodiment, of a communication signal transmission mode based on a technique of putting the nodes to sleep and preamble sampling.

FIG. 2 represents the theory of operation, according to a second embodiment, of a communication signal transmission mode based on a technique of putting nodes to sleep and preamble sampling. This second embodiment notably enables nodes relaying a preamble transmitted by a transmitter node also to send data to any node of the network without in turn transmitting another preamble. The second mode is moreover very suitable when the traffic on the network is sustained.

The transmitter node $N_{2E}$ transmits data $D_2$ to a destination node $N_{2D}$.

These transmission steps are preceded by a step of transmission of an initial preamble $P_2$. The preamble $P_2$ includes a set of information enabling determination of which node the data $D_1$ is intended for and when the latter data will be transmitted by the transmitter node $N_{2E}$. This set of information may thus include one or more items of information from the following list: the identification of the destination node $N_{2D}$, an indication relating to a preamble mutualization mode, the address of the destination node $N_{2D}$, the time remaining before the transmission of data, the period in which the data $D_2$ will be transmitted, the time corresponding to the beginning of the transmission of the data $D_2$ or the address of the transmitter node $N_{2E}$. The preamble mutualization mode is for example chosen from a group comprising a single destination preamble mutualization mode and a multiple destination preamble mutualization mode. The single destination preamble mutualization mode is then a mode in which neighbor nodes are authorized to send data only to the destination node $N_{2D}$. The multiple destination preamble mutualization mode is then a mode in which neighbor nodes are authorized to send data to any other node of the network.

In particular, time information, such as the time remaining before the transmission of the data $D_2$, the period in which the data $D_2$ will be transmitted or the time corresponding to the start of the transmission of the data $D_2$ may be expressed as a number of modulation symbol times, the modulation symbol times being common to all the nodes of the network.

This information may be situated at the end of the preamble or be repeated throughout preamble transmission.

The duration of the initial preamble $P_2$ is very much less than the sleeping period of a node. For example, the duration of the preamble $P_2$ is of the order of a few milliseconds. For example, the duration of the initial preamble $P_2$ is less than five milliseconds to satisfy rules defined by regulations covering ultra wide band systems applied in some countries.

By way of nonlimiting examples of the invention, FIG. 2 shows three substeps $SE_{21}$, $SE_{22}$, $SE_{23}$ and $SE_{24}$ performed by the neighbor nodes $N_{2V1}$, $N_{2V2}$, $N_{2V3}$ and $N_{2V4}$, respectively, of the transmitter node $N_{2E}$. During all the substeps the transmitter node $N_{2E}$ continues to listen to transmissions from neighbor nodes, in particular all the preambles transmitted.

During a substep $SE_{21}$, the neighbor node $N_{2V1}$, awakened at a time $T_{2V}$ when the initial preamble $P_2$ is transmitted by the transmitter node $N_{2E}$, detects the preamble $P_2$ and receives the set of information included in the preamble $P_2$. The neighbor node $N_{2V1}$ remains in the awakened state E until the end of transmission of the initial preamble $P_2$ by the transmitter node $N_{2E}$. The neighbor node $N_{2V1}$ then in turn transmits a preamble $P_{21}$. In the example of FIG. 2, the neighbor node $N_{2V1}$ has data $D_{21}$ to be transmitted to the destination node $N_{2D}$. The neighbor node $N_{2V1}$ may then go to sleep, before entering an awakened state at the time when the transmitter node $N_{2E}$ is going to transmit data.

The preamble $P_{21}$ transmitted by the node $N_{2V1}$ includes all the information included in the preamble $P_2$. Time information such as the time remaining before the transmission of data by the transmitter node $N_{2E}$ is then updated by the node $N_{2V1}$ if necessary. The preamble $P_{21}$ also includes information indicating that the neighbor node $N_{2V1}$ is seeking to transmit data to the destination node $N_{2D}$. This information is for example the address of the neighbor node $N_{2V1}$ in the preamble $P_{21}$.

During a substep $SE_{22}$, the neighbor node $N_{2V2}$, awakened at a time $T_{2V}$ when the preamble $P_{21}$ is transmitted by the neighbor node $N_{2V1}$, detects the preamble $P_{21}$ and receives the set of information included in the preamble $P_{21}$. The neighbor node $N_{2V2}$ has data $D_{23}$ to transmit to the neighbor node $N_{2V3}$. If the preamble $P_{21}$ includes an indication relating to a preamble mutualization mode, the neighbor node $N_{2V2}$ may take note of the preamble mutualization mode. Accordingly, in the example shown in FIG. 2, corresponding to a multiple destination preamble mutualization mode, the neighbor node $N_{2V2}$ may determine that it is authorized to transmit data to the destination node $N_{2V3}$ using the preamble $P_{21}$.

The neighbor node $N_{2V2}$ remains in the awakened state E until the end of transmission of the preamble $P_{21}$ by the neighbor node $N_{2V1}$. On reading the preamble $P_{21}$, the neighbor node $N_{2V2}$ may thus determine that the transmitter node $N_{2E}$ and the neighbor node $N_{2V1}$ are going to transmit data and at what periods these transmissions will take place. The neighbor node $N_{2V2}$ then in turn transmits a modified preamble $P_{22}$. The neighbor node $N_{2V2}$ may then go to sleep, before entering an awakened state at the time when the transmitter node $N_{2E}$ is going to transmit data.

The preamble $P_{22}$ includes all of the information included in the preamble $P_{21}$. Time information such as the time remaining before the transmission of the data $D_2$ is updated if necessary. The preamble $P_{12}$ also includes information indicating that the neighbor node $N_{2V2}$ is seeking to transmit data to the neighbor node $N_{2V3}$, such as for example the concatenation of the address of the neighbor node $N_{2V2}$ followed by the address of the neighbor node $N_{2V3}$ in the preamble $P_{22}$.

During a substep $SE_{23}$, the neighbor node $N_{2V3}$, awakened at a time $T_{2V}$ when the preamble $P_{22}$ is transmitted by the neighbor node $N_{2V2}$, detects the preamble $P_{22}$ and receives the set of information included in the preamble $P_{22}$. The neighbor node $N_{2V3}$ has no data to transmit to another node. The neighbor node $N_{2V3}$ remains in the awakened state E until the end of transmission of the preamble $P_{22}$ by the neighbor node $N_{2V2}$. The neighbor node $N_{2V3}$ then in turn transmits a modified preamble $P_{23}$. On reading the preamble $P_{22}$, the neighbor node $N_{2V3}$ may thus determine that the transmitter node $N_{2E}$ and the neighbor node $N_{2V2}$ are going to transmit data and at what periods these transmissions will take place. The neighbor node $N_{2V3}$ then in turn transmits a modified preamble $P_{23}$. The neighbor node $N_{2V3}$ may then go to sleep before entering an awakened state at the time the transmitter node $N_{2E}$ is going to transmit data.

During a substep $SE_{24}$, the neighbor node $N_{2V4}$, awakened at a time $T_{2V}$ when the preamble $P_{23}$ is transmitted by the neighbor node $N_{2V2}$, detects the preamble $P_{23}$ and receives the set of information included in the preamble $P_{23}$. The neighbor node $N_{2V4}$ has no data to transmit to another node. The neighbor node $N_{2V3}$ remains in the awakened state E until the end of transmission of the preamble $P_{22}$ by the neighbor node $N_{2V2}$. In the example of FIG. 2, the neighbor node $N_{2V3}$ does not relay the preamble $P_{23}$ because transmission of the set of data $D_2$ is going to begin at the next modulation symbol time. On reading the preamble $P_{23}$, the neighbor node $N_{2V4}$ can thus notably determine that the transmitter node $N_{2E}$ is going to transmit data and at what period that transmission will take place. The neighbor node $N_{2V3}$ may then go to sleep before entering the awakened state at the time at which the transmitter node $N_{2E}$ is going to transmit data.

Thus at the end of a waiting time $T_A$ at least equal to a sleeping period of a node, the neighbor nodes $N_{2V1}$, $N_{2V2}$, $N_{2V3}$ and $N_{2V4}$ are in the awakened state and the transmitter node $N_{2E}$ transmits descriptive data $P_D$ in a first time period. If the preambles $P_2$, $P_{21}$, $P_{22}$ and $P_{23}$ include an indication relating to a multiple destination preamble mutualization mode, the neighbor nodes $N_{2V1}$, $N_{2V2}$, $N_{2V3}$ and $N_{2V4}$ are aware of that transmission of descriptive data as soon as said preambles are received.

During the substeps $SE_{21}$, $SE_{22}$, $SE_{23}$ and $SE_{24}$, the transmitter node $N_{2E}$ has previously received the preambles $P_{21}$, $P_{22}$ and $P_{23}$. The transmitter node $N_n$ may thus determine the transmission periods and the destinations of the data to be transmitted. Thus the descriptive data $P_D$ includes information relating to the data to be transmitted, in particular the transmitters and destinations, obtained from sets of information included in the preambles $P_{21}$, $P_{22}$ and $P_{23}$. The neighbor nodes $N_{2V1}$, $N_{2V2}$, $N_{2V3}$ and $N_{2V4}$ are awakened when the descriptive data $P_D$ is transmitted. For example, the sending of the data $D_2$ is preceded by the sending of the descriptive data $P_D$. Thus the neighbor nodes $N_{2V1}$, $N_{2V2}$, $N_{2V3}$ and $N_{2V4}$, knowing the start of transmission of the data transmitted by the transmitter node $N_{2E}$, may manage their awakened state in order to receive the descriptive data $P_D$. The nodes having received the descriptive data $P_D$ may thus manage their awakened state in order to be in an awakened state only when data will be transmitted to them.

In the example of FIG. 2, the descriptive data $P_D$ includes at least information to the effect that data $D_2$ followed by data $D_{21}$ is going to be transmitted to the destination node, then the data $D_{22}$ to the neighbor node $N_{2V3}$. On reading the descriptive data $P_D$, the transmitter node $N_{2E}$ may thus determine the period during which it must remain in the awakened state to receive the data $D_2$ and $D_{21}$, and consequently the periods in which it can go to sleep again. On reading the descriptive data $P_D$, the neighbor node $N_{2V3}$ may also determine the period during which it must remain in the awakened state to receive the data $D_{22}$ and consequently the periods in which it may go to sleep again. On reading the descriptive data $P_D$, the neighbor node $N_{2V4}$ may determine that no data will be transmitted to it. It may thus remain in the sleeping state after the end of reception of the descriptive data $P_D$.

After transmitting the descriptive data $P_D$ the transmitter node $N_{2E}$ transmits the data $D_2$. The neighbor node $N_{2V1}$ then transmits the data $D_{21}$ after transmitting the data $D_2$. The neighbor node $N_{2V2}$ then in turn transmits the data $D_{22}$ to the neighbor node $N_{2V3}$ as soon as the transmission of the data $D_{22}$ ends.

The invention also includes management of conflict when relaying a preamble. It is a matter of determining which neighbor node is going to relay the preamble when at least two neighbor nodes have heard the same preamble and are ready to relay it, taking account of the awakening time of each of the neighbor nodes concerned relative to the transmission of the preamble.

The earlier a neighbor node is awakened during the transmission of the preamble, the higher the priority of that node for relaying the transmission of the preamble.

The transmission duration of a preamble is defined beforehand, among other things to satisfy rules defined by a transmission mode or other constraints.

Consequently, a neighbor node is capable of measuring the residual time between the time at which it awakens and hears the preamble and the time corresponding to the end of transmission of the preamble.

To prevent conflict with another neighbor node, a neighbor node that has heard the preamble is placed in a listening situation between the end of transmission of the preamble and the time at which it must itself transmit the preamble. If during this waiting time it does not hear the preamble, this means that no other neighbor node has transmitted it and that it is the priority neighbor node for relaying and transmitting the preamble.

The waiting time of a node before it transmits the preamble is inversely proportional to the time for which it has listened to the preamble. This waiting time is also less than a predefined threshold to be sure that the preamble is actually transmitted.

Figure 3:
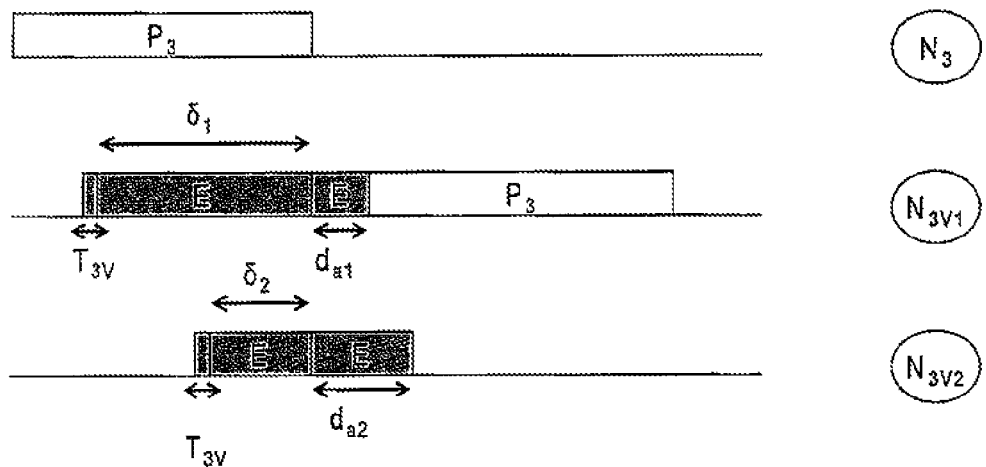
FIG. 3 is a timing diagram showing management of conflict between two neighbor nodes able to transmit a preamble.

FIG. 3 represents management of conflict between two neighbor nodes able to transmit a preamble. A node $N_3$ transmits a preamble $P_3$. The node $N_3$ may be a transmitter node that transmits an initial preamble $P_3$ or a neighbor node that relays the transmission of a preamble.

Two neighbor nodes $N_{3V1}$ and $N_{3V2}$ hear the preamble $P_3$ during their respective awakened times $T_{3V}$. The neighbor nodes $N_{3V1}$ and $N_{3V2}$ then listen to the preamble $P_5$ until the end of transmission thereof during respective times $\delta_1$ and $\delta_2$.

The neighbor node $N_{3V1}$ having listened for longer to the transmission of the preamble $P_3$ ($\delta_1$ being greater than $\delta_2$) is the node with priority for transmitting the preamble $P_3$. The waiting time $d_{a1}$ of the node $N_{3V1}$ before it transmits in turn the preamble $P_3$ is less than the waiting time $d_{a1}$ of the node $N_{3V2}$.

During the waiting time $d_{a2}$, the node $N_{3V2}$ hears that the preamble has been transmitted. It thus has no need to transmit it and may go back to sleep.

Instead of going back to sleep, the node $N_{3V2}$ may equally listen to the successive relays and intervene to transmit the preamble if relaying does not proceed correctly, notably if it is interrupted. In particular, in this latter case, if the node $N_{3V2}$ has data to transmit to one of the nodes, it may then introduce the necessary information into the preamble to inform the node for which said data is intended of this future transmission.

The number of nodes considered for describing conflict management is illustrative and is not limiting of the invention.

Figure 4:
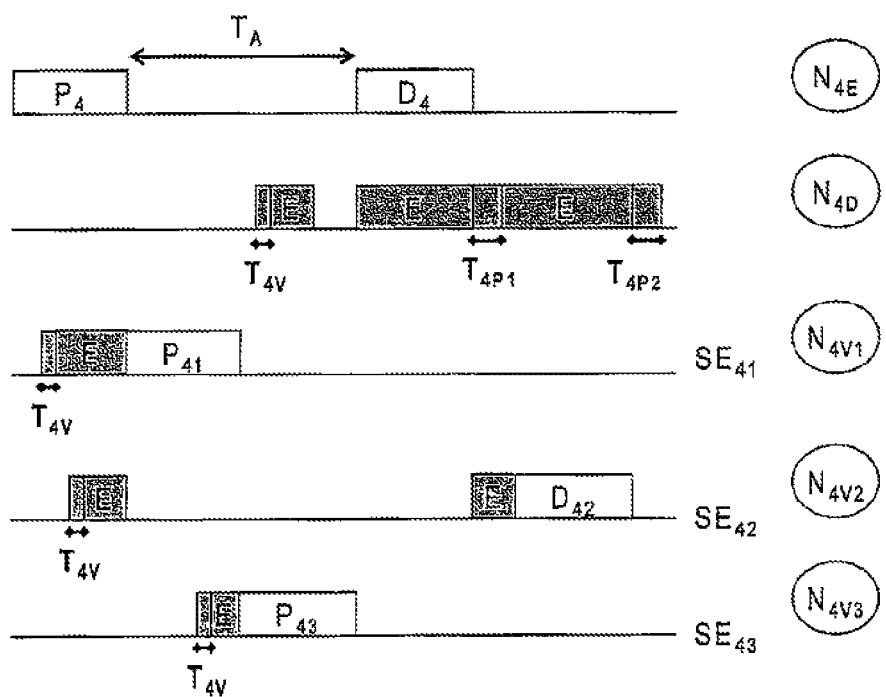
FIG. 4 is a timing diagram showing the theory of operation in one embodiment of a mode of transmission of data by a neighbor that has not transmitted a preamble.

FIG. 4 presents the theory of operation, in one embodiment, of a mode of transmission of data by a neighbor node that has not transmitted a preamble. In particular, such a situation may arise for example following arbitration between two neighbor nodes, during conflict managements, the node that has not transmitted a preamble having data to transmit to another node.

The transmitter node $N_{4E}$ transmits data $D_4$ to a destination node $N_{1D}$.

These transmission steps are preceded by a step of transmission of an initial preamble $P_4$ including, among other things, the identification of the destination node $N_{4D}$. By way of nonlimiting examples of the invention, FIG. 4 shows three substeps $SE_{41}$, $SE_{42}$ and $SE_{43}$ carried out by the neighbor nodes $N_{4V1}$, $N_{4V2}$ and $N_{4V3}$, respectively, of the transmitter node $N_{4E}$.

During a substep $SE_{41}$, the neighbor node $N_{4V1}$, awakened during a time $T_V$ when the initial preamble $P_1$ is transmitted by the transmitter node $N_{1E}$, detects the preamble $P_4$.

During a substep $SE_{42}$, the neighbor node $N_{4V2}$, awakened during a time $T_V$ when the initial preamble $P_1$ is transmitted by the transmitter node $N_{1E}$ detects the preamble $P_4$. The neighbor node $N_{4V2}$ has data $D_{42}$ to transmit to the destination node $N_{4D}$.

A conflict management mode, such as that described above, for example, enables arbitration leaving the neighbor node $N_{4V1}$ responsible for the transmission of a preamble $P_{41}$. The neighbor node $N_{4V2}$ therefore transmits no preamble.

During a substep $SE_{43}$, the neighbor node $N_{4V3}$, awakened during a time $T_V$ when the preamble $P_{41}$ is transmitted by the neighbor node $N_{4V1}$, detects the preamble $P_{41}$. The neighbor node $N_{4V3}$ then transmits in turn a modified preamble $P_{43}$.

At the end of a waiting time $T_A$ at least equal to a sleeping period of a node, all the nodes having data to transmit and that have transmitted at least one preamble transmit data. In the example of FIG. 4, only the transmitter node $N_{4E}$ transmits data $D_1$. The neighbor node $N_{4V2}$ having been unable to transmit a preamble, the destination node $N_{4D}$ then does not know that the neighbor node $N_{4V2}$ has data to transmit.

Also, after transmission of data from nodes having data to transmit and having transmitted at least one preamble, the destination node remains awake during a time-delay $T_{4P1}$ to verify if there is any other data for it. Thus if during the time-delay $T_{4P1}$ data for the destination node $N_{4D}$ is received, then the destination node $N_{4D}$ remains awake until the expiry of a new time-delay $T_{4P2}$ after the end of reception of said data. A new sleeping period of the destination node $N_{4D}$ begins only if no data is received by the end of the new time-delay $T_{4P2}$. The destination node $N_{1D}$ thus remains awake for the duration of a string of periods of reception of data then of time-delay periods, so long as data is transmitted to it. In the example of FIG. 4, after the end of the transmission of the data $D_4$, the neighbor node $N_{4V2}$ enters an awakened state to listen whether data addressed to one of the neighbor nodes is transmitted by one of the other neighbor nodes. As no other node transmits, the neighbor node $N_{4V2}$ transmits the data $D_{42}$ to the destination node $N_{4D}$. A new time-delay period $T_{4P2}$ begins after the end of transmission of the data $D_{42}$. No data having been transmitted, the destination node $N_D$ may then go back to sleep.

The example shown relates to the case where the neighbor node $N_{4V2}$ that has not been able to transmit a preamble has data to transmit to the destination node $N_{4D}$. However, the theory of operation shown in FIG. 4 of a mode of transmission of data by a neighbor node that has not transmitted a preamble applies in a substantially similar manner to the case where the neighbor node $N_{4V2}$ has data to transmit to another node, such as the neighbor node $N_{4V1}$ or the node $N_{4V3}$, for example.

In the case, not shown in FIG. 4, where a plurality of nodes are in the same situation as the node $N_{4V2}$, i.e. if a plurality of nodes having data for the destination have not sent a preamble, it is possible to manage any conflict between those nodes by applying a traditional conflict management process, such as the contention access mode, for example. The nodes in conflict draw a random period during which they listen to the channel; if any of the nodes detects transmission during this period, it delays the transmission of its packet; otherwise it transmits.

Figure 5:
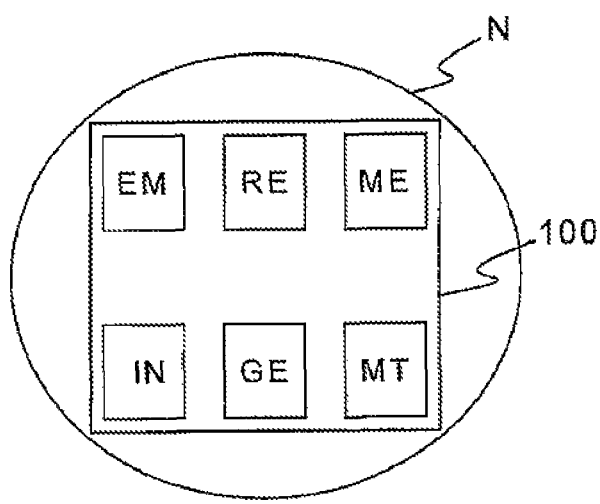
FIG. 5 is a functional block diagram of a node.

FIG. 5 represents a functional block diagram of a node. A node N includes a receiver/transmitter device 100. The receiver/transmitter device 100, whether on board a transmitter node, a destination node or a neighbor node or not, includes a transmitter module EM. This transmitter module EM enables generation of a communication signal. The generated signal may correspond to a preamble or to data as described above.

The receiver/transmitter device 100 also includes a module RE for receiving a communication signal similar to that described above.

The receiver/transmitter device 100 includes a module ME for listening to a transmission channel on which are conveyed communication signals corresponding to a preamble or to data. The listening module ME may be incorporated into the receiver module RE.

The receiver/transmitter device 100 includes a module IN for interpreting the content of a preamble. The module IN may notably read information contained in a preamble.

The receiver/transmitter device 100 also includes a generator module GE enabling generation of information to be integrated into a preamble and modification of the content of a preamble.

The receiver/transmitter device 100 further includes means MT able to measure time.

The receiver/transmitter device 100 also includes a control unit, not shown, connected to each of the modules EM, RE, ME, IN, GE and to the means MT and adapted to control their operation.

The various modules and means described above are adapted to implement the steps of the method described above.

The receiver/transmitter device 100 may thus relay the transmission of a preamble thanks to the transmitter module EM. Relaying is the process of transmitting a preamble formed from the preamble transmitted during a preceding relay. A preamble is formed by the generator module GE. The preamble transmitted in the first relay is formed from the initial preamble and relaying continues until the destination node for the data detects the transmitted preamble.

The modules EM, RE, ME, IN, GE and the means MT may be software modules forming a computer program. Thus the invention also concerns a computer program including software instructions for execution by a node of the method described above.

The software module may be stored in or transmitted by a data medium. This may be a hardware storage medium, for example a CD-ROM, a magnetic diskette or a hard disk, or a transmissible medium such an electrical, optical or radio signal.

The invention may be implemented in ad hoc networks and more particularly in sensor networks. The sensors, corresponding to the nodes, may be temperature, pressure, etc. probes.

The invention claimed is:

1. A method of transmission of data in a network including a plurality of nodes alternating sleeping periods and waking periods asynchronously with respect to each other, said method being implemented by a first node, wherein it comprises the following steps:
   receiving a first preamble transmitted by at least one transmitter node, said transmitter node and said first node being distinct, the first preamble including at least one first set of information relating to transmission by the transmitter node of a first set of data to a destination node;
   modification of the first preamble by adding a second set of information relating to the transmission of a second set of data by the first node;
   transmission of the first preamble as modified before the transmission of the first set of data; and
   transmitting to the destination node or to a second node the second set of data after transmission of the first set of data.

2. The method as claimed in claim 1, wherein the first preamble includes an indication relating to a preamble mutualization mode, said indication belonging to a group comprising a single destination mutualization mode and a multiple destination mutualization mode.

3. The method as claimed in claim 2, wherein the indication relating to a preamble mutualization mode corresponds to the single destination mutualization mode and the second set of information added relates to a transmission of the second set of data by the first node to the destination node, the second set of data being transmitted to the destination node during the transmitting to the destination node or to the second node of the second set of data after transmission of the first set of data.

4. The method of reception by a node of a preamble transmitted by at least a first node by the method as claimed in claim 1, said method comprising the following steps implemented by said node:
   receiving the preamble;
   extracting information included in the preamble announcing at least the transmission of the first set of data to a destination node;
   if the node is the destination node announced in the preamble, receiving the first and second sets of data.

5. The method as claimed in claim 4, further comprising a step of awaiting other sets of data following reception of the first and second sets of data.

6. The reception method as claimed in claim 4, comprising the following steps:
   extracting information included in the preamble including an indication relating to the preamble mutualization mode, said indication belonging to a group comprising a single destination mutualization mode and a multiple destination mutualization mode;
   if the node is not the destination node, sleeping for a period calculated as a function of said indication.

7. The reception method as claimed in claim 6, wherein if the node is not the destination node announced and if the preamble mutualization mode indicated is the multiple destination mode, said method comprises the following steps:
   sleeping until the beginning of the transmission of the first set of data;
   receiving descriptive data coming from the transmitter node;
   if the descriptive data includes information indicating that the node is the destination of a set of data, receiving said set of data.

8. The method as claimed in claim 7, wherein said method comprises a step of sleeping after the reception of the descriptive data if the descriptive data does not include any information relating to the transmission of a set of data to the node.

9. A non-transitory computer program product comprising instructions for implementing the reception method as claimed in claim 4 when the program is executed by a computer.

10. A device for receiving a preamble transmitted by at least one first node by the method as claimed in claim 1, comprising:
   a receiver for receiving the preamble;
   an extractor for extraction of information included in the preamble announcing at least the transmission of the first set of data to a destination;
   a receiver adapted to receive the first and the second sets of data if the device is the destination announced in the preamble.

11. A node in a network including a plurality of nodes alternating sleeping periods and waking periods asynchronously relative to each other, wherein it includes:
   a data transmission device adapted to be integrated into a network including a plurality of nodes alternating sleeping periods with waking periods asynchronously with respect to each other, comprising:
      a receiver adapted to receive a first preamble transmitted by at least one transmitter node, the first preamble including at least one first set of information relating to transmission by the transmitter node of a first set of data to a destination node;
      modification element adapted to modify the first preamble by adding a second set of information relating to the transmission of the second set of data by the first node;
      a transmitter adapted to transmit the first preamble as modified before the transmission of the first set of data; and
      a transmitter adapted to transmit to the destination node or to a second node a second set of data after transmission of the first set of data,
   the node further comprising:
   the receiver device as claimed in claim 10.

12. A non-transitory computer program product comprising instructions for implementing the transmission method as claimed in claim 1 when the program is executed by a computer.

13. A data transmission device adapted to be integrated into a network including a plurality of nodes alternating sleeping periods with waking periods asynchronously with respect to each other, comprising:
   a receiver adapted to receive a first preamble transmitted by at least one transmitter node, said transmitter node and said first node being distinct, the first preamble including at least one first set of information relating to transmission by the transmitter node of a first set of data to a destination node;
   modification element adapted to modify the first preamble by adding a second set of information relating to the transmission of the second set of data by the first node;
   a transmitter adapted to transmit the first preamble as modified before the transmission of the first set of data; and
   a transmitter adapted to transmit to the destination node or to a second node a second set of data after transmission of the first set of data.

* * * * *